UNITED STATES PATENT OFFICE.

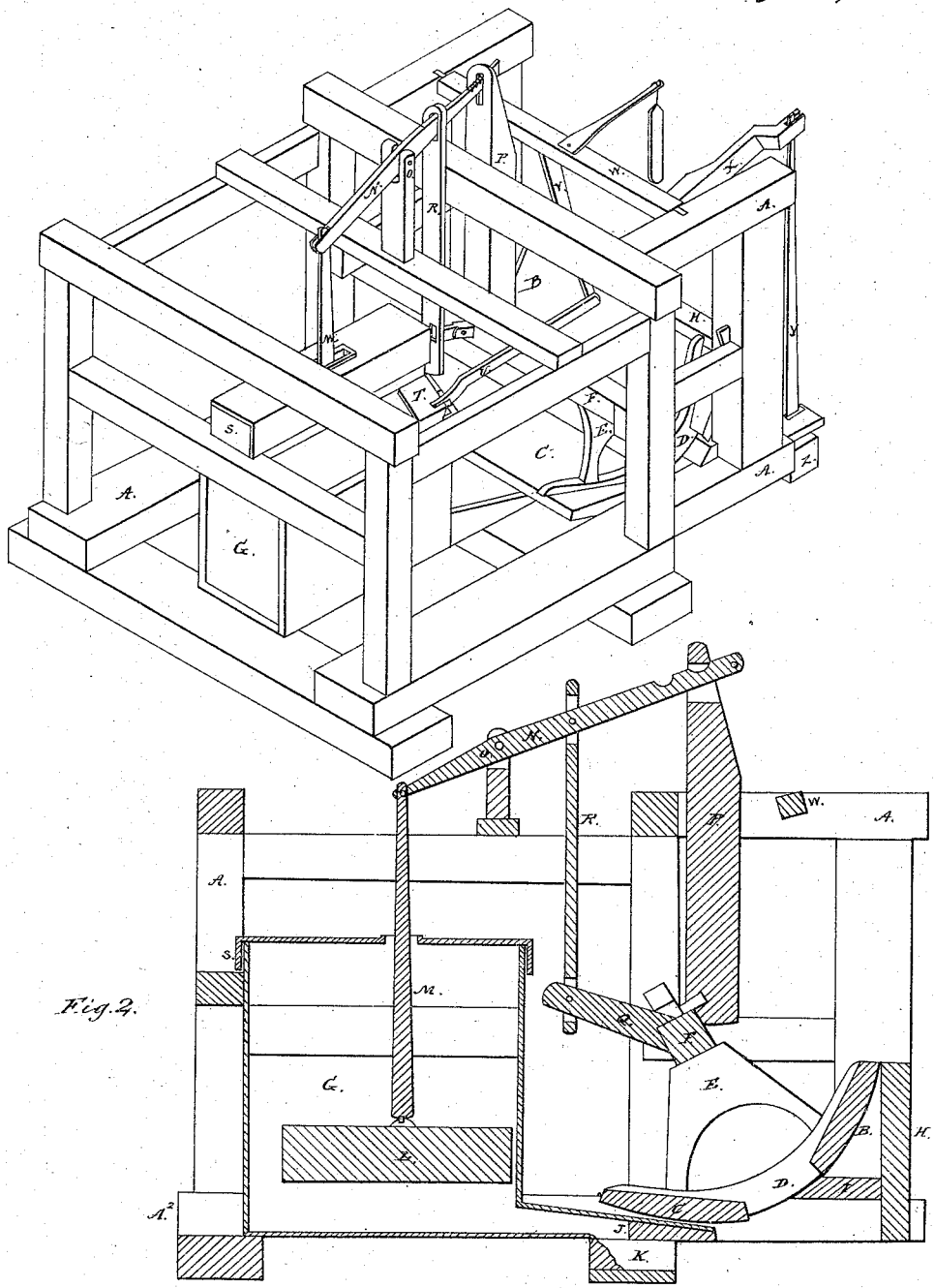

CHARLES ROSS, OF WEST BUDDICK, OHIO.

FEED-REGULATOR FOR CANALS.

Specification of Letters Patent No. 7,384, dated May 21, 1850.

*To all whom it may concern:*

Be it known that I, CHARLES ROSS, of West Buddick, in the county of Van Wert and State of Ohio, have invented a new and useful Hydraulic Regulator for Mill Reservoirs, Races, and Canals; and I do hereby declare that the following is a full and exact description of the construction and operation of the same, reference being had to the annexed drawings, making part of this specification, in which—

Figure 1 is a perspective view, and Fig. 2 is a longitudinal section.

The use to which this invention is applicable, is to so regulate, by a self-adjusting principle, the supply of water to mills or canals, that they may not be subject to a dangerous or inconvenient redundance (except in times of freshets,) nor a deficiency when a supply may be obtained. It is suitable for a feeder of a canal or mill-race, and requires no attention from any person to keep it properly adjusted.

The machinery of this regulator is supported by a strong frame-work A A, which may be variously constructed according to location and other circumstances, and requires no particular description. The direction of the current is from left to right—from $A^2$ to $B^2$ Fig. 2.

Two segment gates B and C, are attached to curved cleats D, and connected by arms or sectors E to a horizontal rocking shaft F. This shaft is mounted on pivots at the ends, and so adjusted that the gates, in their occasional curvilinear motion, pass nearly in contact with the bulkhead H, the breast I and the apron J. The space between the apron and the breast, constitutes an undercurrent vent, and is about equal in breadth to the space between the two gates. The machine is so adjusted, whether as a feeder or a waste-gate, that the top of the bulkhead H is as high as the surface of the advancing water, on the left thereof when at its lowest stage, so that an increase causes the water to pour over the bulkhead H, unless prevented by the elevation of the gates.

A large water-tight box G communicates with the receding water by the flume K. Within this box is a hollow float L, suspended by a vertical rod M from one end of a balance beam N, which is mounted centrally on a fulcrum pivot at O. From the right end of this beam is suspended a plunger P the weight of which aids the elevation of the gates. An arm Q projects to the left from the rocking shaft F, and is connected to the balance beam by a vertical connecting rod R. Thus when the receding water rises so as to flow back into the box G, the float is thereby elevated, whereby the gates are also elevated, and the flow of water to the right through the machine is reduced.

The box G has a long narrow aperture at the top, over which is placed a bonnet S, the sides and top of which do not come in contact with those of the box, but are about an inch distant. When the advancing water rises to the top of the box G, it pours into the box through the apex aperture, and fills the float L (which is open at the top) and depresses or causes it to descend, whereby the two segment gates are also depressed and the escape of water is thus facilitated. The float has a small aperture through its bottom, through which the water soon leaks out and allows the float to ascend to its ordinary position. (This aperture is ordinarily closed by a clapper valve, outside.)

A small sliding gate T is adjusted to the side of the box so low as to be generally submerged. This gate is connected by a rod U to the end of an arm V which extends downward from a rocking shaft W. From this shaft another arm X projects horizontally to the right, and from the end of this arm is suspended a rod Y, to the bottom of which is attached the float Z. Whenever the surface of the receding water descends too low, the descent of the float opens the sliding gate sufficiently to admit a stream of water to fall into the float L, causing it to descend, whereby the large gates are made to descend, and a large quantity of water passes into the canal and thus prevents the sudden fall or diminution which is sometimes occasioned by the lockage of boats; but this extra flood is stayed as soon as the water in the canal rises to its ordinary level. This arrangement is required to operate only on extraordinary occasions.

What I claim as my invention and desire to secure by Letters Patent, is—

The combination of the box G, the float L, sliding valve T, segment gate B C, and float Z, arranged and connected with the mechanism whereby they have an united action, in the manner and for the purpose herein described.

CHARLES ROSS.

Witnesses:
A. G. HOWELL,
JONAH DELONG.